United States Patent
Chou et al.

(10) Patent No.: US 9,225,909 B1
(45) Date of Patent: Dec. 29, 2015

(54) IMAGE CAPTURING DEVICE AND DIGITAL ZOOM DISPLAY METHOD

(71) Applicant: ALTEK SEMICONDUCTOR CORPORATION, Hsinchu (TW)

(72) Inventors: Hong-Long Chou, Hsinchu County (TW); Yi-Hong Tseng, Hsinchu (TW); Wen-Yan Chang, Miaoli County (TW); Yu-Chih Wang, Tainan (TW); Chia-Chun Tseng, Hsinchu (TW); Tai-Chang Yang, Hsinchu (TW); Che-Lun Chuang, Hsinchu (TW); Tsan-Wei Wang, Taitung County (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/551,144

(22) Filed: Nov. 24, 2014

(30) Foreign Application Priority Data

Oct. 9, 2014 (TW) .............................. 103135294 A

(51) Int. Cl.
*H04N 5/232* (2006.01)
*H04N 9/04* (2006.01)
*G06T 7/00* (2006.01)

(52) U.S. Cl.
CPC .......... *H04N 5/23296* (2013.01); *G06T 7/0097* (2013.01); *H04N 5/23212* (2013.01); *H04N 5/23232* (2013.01); *H04N 9/04* (2013.01); *G06T 2207/20221* (2013.01)

(58) Field of Classification Search
CPC . H04N 5/23296; H04N 9/04; H04N 5/23232; H04N 5/23212; G06T 7/0097; G06T 2207/20221

USPC .......... 348/211.9, 240.99, 240.1, 240.2, 252, 348/333.11, E3.02, E5.055, 806, E3.043
See application file for complete search history.

(56) References Cited

U.S. PATENT DOCUMENTS

| | | | | |
|---|---|---|---|---|
| 2006/0125937 | A1* | 6/2006 | LeGall | H04N 5/232 348/240.99 |
| 2006/0206264 | A1* | 9/2006 | Rasmussen | G01C 21/32 701/455 |
| 2010/0238327 | A1* | 9/2010 | Griffith | H04N 5/2251 348/240.99 |
| 2012/0268641 | A1* | 10/2012 | Kazama | H04N 5/23212 348/333.11 |
| 2013/0286254 | A1* | 10/2013 | Watanabe | H04N 5/2355 348/239 |
| 2015/0109408 | A1* | 4/2015 | Sharma | H04N 5/23293 348/39 |

\* cited by examiner

*Primary Examiner* — Hung Lam
(74) *Attorney, Agent, or Firm* — Bacon & Thomas, PLLC

(57) ABSTRACT

An image capturing device and a digital zoom display method are provided. The device includes two lens modules configured to respectively capture a first image and a second image, and their capturing view fields are substantially identical, a preview processing unit configured to generate a third image by down-sampling the first image according to a display unit's resolution, a feature extraction unit, an image zooming and distortion unit and an image fusing unit. The second image is trimmed for generating a fourth image according to the same size of the third image. A pixel offset feature corresponding with the third and fourth images is generated by the feature extraction unit. The image zooming and distortion unit generates a fifth image and a sixth image according to the pixel offset feature and zoom ratio to the image fusing unit to generate a combined image displayed on the display unit.

6 Claims, 4 Drawing Sheets

IMAGE CAPTURING DEVICE AND DIGITAL ZOOM DISPLAY METHOD

CROSS-REFERENCE TO RELATED APPLICATION

This application claims priority from Taiwan Patent Application No. 103135294, filed on Oct. 9, 2014, in the Taiwan Intellectual Property Office, the content of which are hereby incorporated by reference in their entirety for all purposes.

BACKGROUND OF THE INVENTION

1. Field of the Invention

The present invention relates to a digital zoom technique, in particular with respect to an image capturing device and a digital zoom display method using multiple lenses to promote the quality of the digital zoom display.

2. Description of the Related Art

Compared with the optical zoom technique, extra optical mechanism is unnecessary to the digital zoom technique, so that it benefits the camera from downsizing and lowering cost. However, the digital zoom technique per se has the to-to-resolved technical problems. Because the image detail is unable to be increased after the digital image is zoomed in, it is inevitable that the higher the magnifying power is, the vaguer and more distorted the image will be.

Provided that resolution of a screen of an imaging device is lower than resolution of an imaging lens, when previewing images, the imaging device often down-sampling the captured image to match up the resolution of the screen. As a result, when a user is zooming the image when previewing, the vagueness and distortion caused by the digital zoom technique become more obvious.

SUMMARY OF THE INVENTION

In as much as the preceding technical problems, purpose of the present invention is to provide an image capturing device and a digital zoom display method which use multiple lenses to avoid the image detail becoming vague when the digital zoom is used.

According to the aforementioned purpose, the present invention is to provide an image capturing device which may include a display unit, a first lens module, a second lens module, a preview processing unit, a feature extraction unit, an image zooming and distortion unit and an image fusing unit. The first lens module may capture a first image; the second lens module may capture a second image, wherein an angle of view of the second lens module may be substantially identical to the first lens module; the preview processing unit may couple to the first lens module and the second lens module and generate a third image by down-sampling the first image according to screen resolution of the display unit, and generate a fourth image by trimming the second image with an image size identical to the third image; the feature extraction unit may couple to the preview processing unit and extract a plurality of first image features of the third image and a plurality of second image features in the fourth image, and generate the pixel offset feature corresponding with the third image and the fourth image according to the plurality of first image features and the plurality of second image features. The image zooming and distortion unit may couple to the feature extraction unit and zoom the third image to generate a fifth image according to a zoom ratio, and zoom the fourth image to generate a six image according to the pixel offset feature and the zoom ratio, wherein an angle of view and a capturing area of the sixth image may be similar to a central area of the fifth image. The image fusing unit may couple to the image zooming and distortion unit and a display unit and fuse the fifth image and the sixth image according to the zoom ratio to generate a combined image that may be displayed on the display unit.

Preferably, the feature extraction unit may automatically compare and match the plurality of first image features with the plurality of second image features to generate the pixel offset feature.

Preferably, the image fusing unit may fuse the fifth image and the sixth image according to a dynamic weighting method, and the dynamic weighting method may automatically determine weighting values of a plurality of first pixels of the fifth image and a plurality of second pixels of the sixth image according to the zoom ratio and positions of the plurality of first pixels of the fifth image and positions of the plurality of second pixels of the sixth image.

According to the preceding purpose, the present invention further provides a digital zoom display method which may be applicable to an image capturing device having a first lens module, a second lens module, an input unit, a display unit, a feature extraction unit, an image zooming and distortion unit, an image fusing unit and a preview processing unit. Wherein, an angle of view of the second lens module may be substantially identical to that of the first lens module. The digital zoom display method may include the following steps: (a) respectively capturing a first image and a second image by the first image lens module and the second lens module; (b) down-sampling the first image by the preview processing unit according to a screen resolution of the display unit to generate a third image, and trimming the second image to generate a fourth image with an image size identical to that of the third image; (c) extracting a plurality of first image features from the third image and a plurality of second image features from the fourth image by the feature extraction unit, and generating a pixel offset feature corresponding with the third image and the fourth image according to the plurality of first image features and the plurality of second image features; (d) receiving a zoom ratio by the input unit, and zooming the third image by the image zooming and distortion unit according to the zoom ratio to generate a fifth image, and then zooming and deforming the fourth image according to the pixel offset feature and the zoom ratio to generate a sixth image, wherein an angle of view and a capturing area field of the sixth image are similar to a central area of the fifth image; and (e) fusing the fifth image and the sixth image by the image fusing unit according to the zoom ratio to generate a combined image that may be displayed on the display unit.

Preferably, the pixel offset feature may be generated by automatically comparing and matching the plurality of first image features with the plurality of second image features.

Preferably, the step (e) may further include: fusing the fifth image and the sixth image according a dynamic weighting method, wherein the dynamic weighting method may automatically determine weighting values of a plurality of first pixels of the fifth image and a plurality of second pixels of the sixth image according to the zoom ratio and positions of the plurality of first pixels of the fifth image and the plurality of second pixels of the sixth image.

In accordance with the preceding description, an image capturing device and a digital zoom display method according to the present invention may have one or more advantages as follows:

Firstly, an image capturing device and a digital zoom display method of the present invention is capable of effectively lowering the vagueness and distortion resulted from the digital zoom display.

Secondly, an image capturing device and a digital zoom display method of the present invention is able to provide smooth changes between long/short focal length of the digital zoom display.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1:
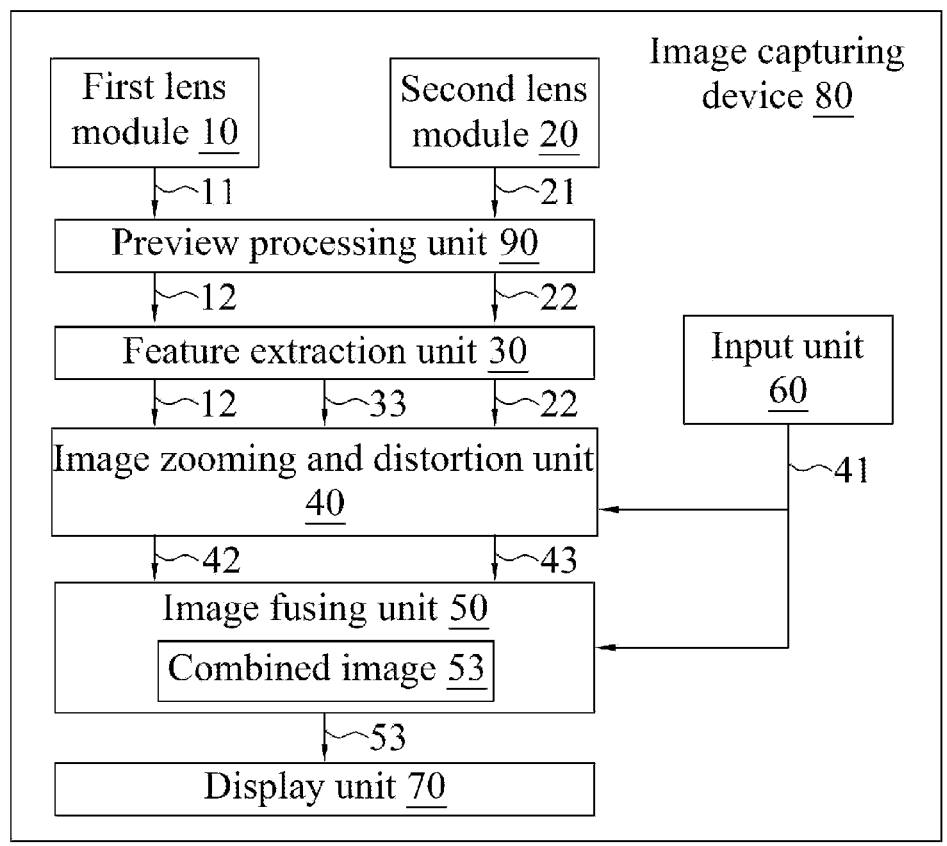
FIG. 1 is a block diagram of an embodiment of an image capturing device according to the present invention.

Please refer to FIG. 1 which is a block diagram of an embodiment of an image capturing device according to the present invention. In the FIG., an image capturing device 80 may include a first lens module 10, a second lens module 20, a feature extraction unit 30, an image zooming and distortion unit 40 coupling to the feature extraction unit 30, an image fusing unit 50 coupling to the image zooming and distortion unit 40 and a preview processing unit 90 coupling to the first lens module 10, the second module 20 and the feature extraction unit 30. The first lens module 10 and the second lens module 20 of the image capturing device 80 of the present invention may be mounted at the same side of the image capturing device 80 and guided toward the same direction.

The feature extraction unit 30, the image zooming and distortion unit 40, the image fusing unit 50 and the preview processing unit 90 may be the processing units of the image capturing device 80 which may be executed by means of software way, i.e. the feature extraction unit 30, the image zooming and distortion unit 40, the image fusing unit 50 or the preview processing unit 90 respectively may belong to the executable program code of the processing unit; or the feature extraction unit 30, the image zooming and distortion unit 40, the image fusing unit 50 or the preview processing unit 90 which is respectively the specific circuit of the processing unit may be executed by means of hardware way; or they may be executed by a hybrid of software and hardware, i.e. partial units may be executed by software way and the others may be executed by hardware way. The processing units may be a CPU or a MCU. The executable program code of the processing units may be store in HD, RAM or ROM. In addition, the image capturing device 80 may further include an input unit 60 and a display unit 70.

The first lens module 10 may capture a first image 11, the second lens module 20 may capture a second image 21, wherein an angle of view of the first lens module 10 and the second lens module 20 may be substantially identical, and a field of view of the second lens module 20 may be substantially identical with the first lens module 10. In practice, the first lens module 10 and the second lens module 20 may respectively include an image capturing lens and an image sensor, ranges of image capturing lens of the first lens module 10 and that of the second lens module 20 may be substantially identical, and the first image 11 and the second images 21 may include the same image feature.

The aforementioned image sensor may include the image sensor using charge-coupled device (CCD) or complementary metal-oxide-semiconductor (CMOS).

Figure 2:
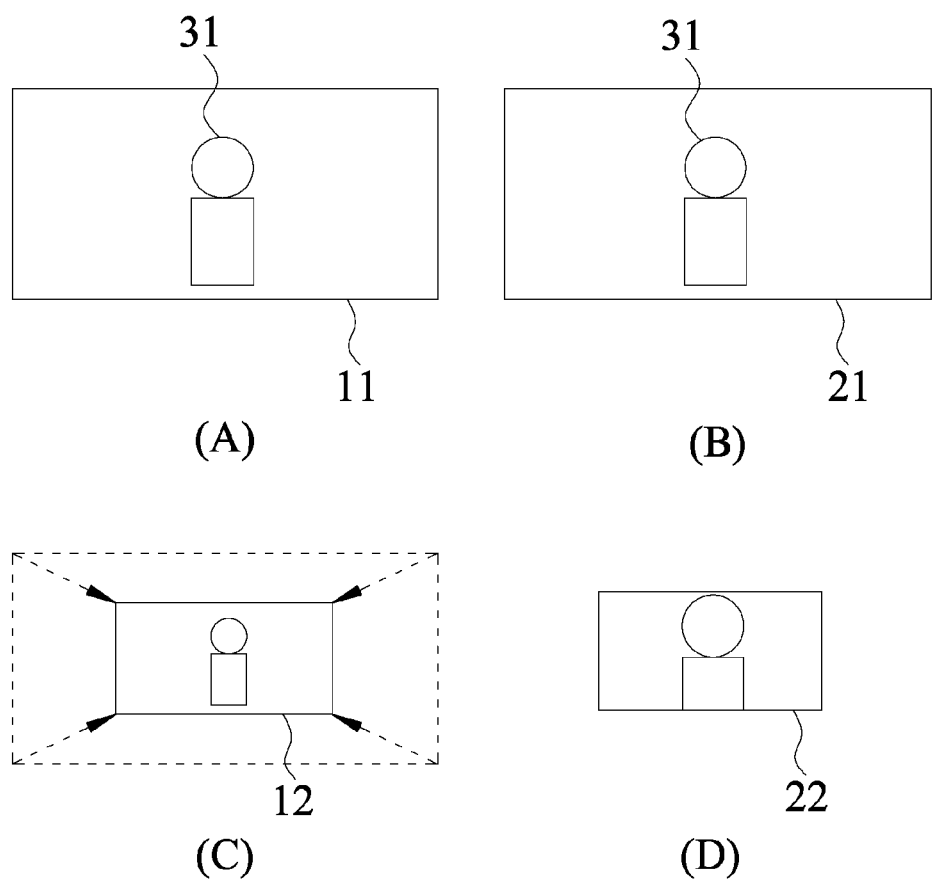
FIG. 2 is a first schematic diagram of an embodiment of an image capturing device according to the present invention.
Figure 3:
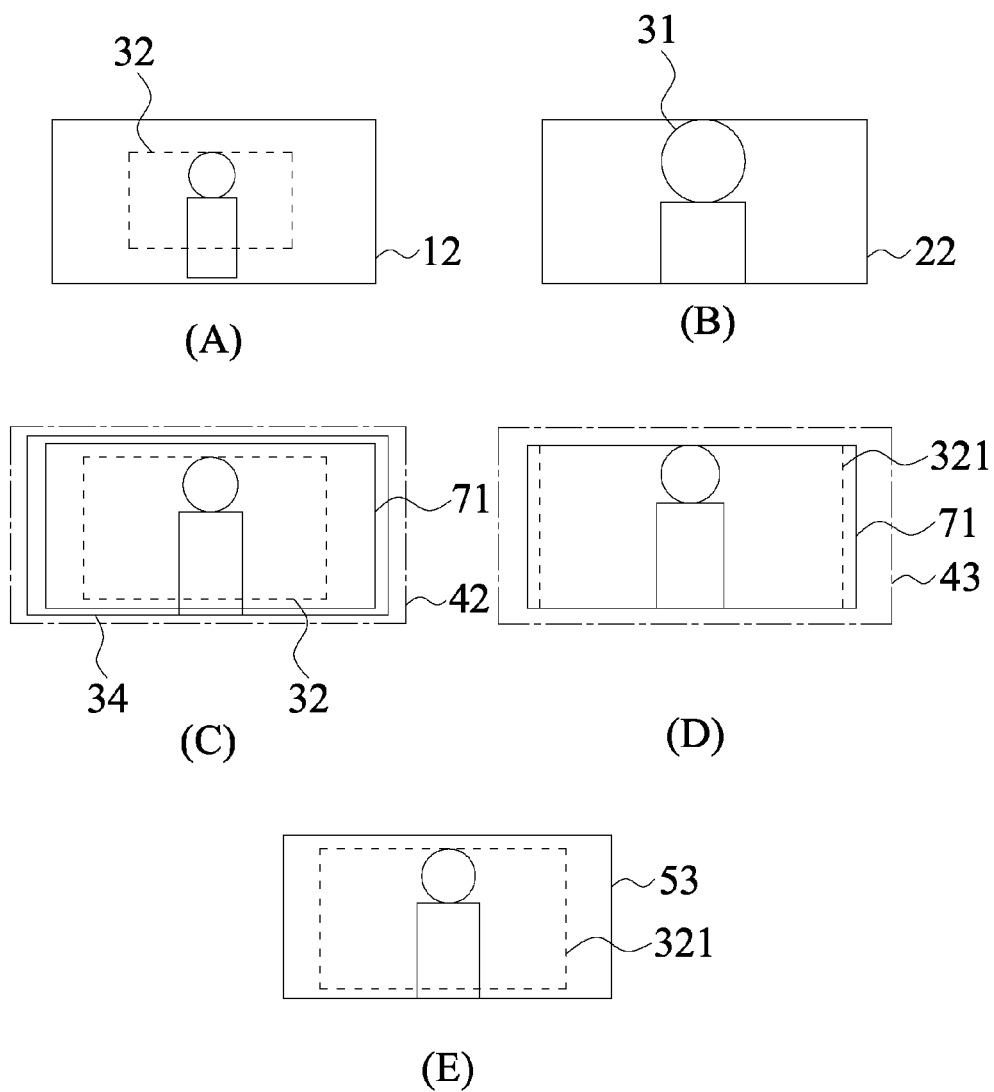
FIG. 3 is a second schematic diagram of an embodiment of an image capturing device according to the present invention.

Please refer to FIGS. 2 and 3 together which are respectively first schematic diagram and second schematic diagram of an embodiment of an image capturing device according to the present invention. Because resolution of the first image 11 or the second image 21 may be larger than the display unit 70, when a user desires to preview the image, it may have to execute down-sampling to the first image 11 or the second image 21 such that the image can be displayed on the display unit 70. Take the first image 11 as example, the preview processing unit 90 may execute down-sampling to the first image 11 according to resolution of the display unit 70 to generate a third image 12. As part (C) of FIG. 2 shows, size of the third image 12 shown in the FIG. may correspond with that of the display unit 70 for demonstrating size or resolution of the display unit 70 which may be smaller than the first image 11. In addition, it is noteworthy that the first image 11 and the second image 21 may include the same image feature 31 simultaneously as shown in parts (A) and (B) of FIG. 2.

Following, the preview processing unit 90 may trim the second image 21 according to resolution of the third image 12 to generate a fourth image 22 with the same size as shown in part (D) of FIG. 2. It can be found by comparing parts (C) with (D) of FIG. 2 that as lacking down-sampling process, the fourth image 22 outputted by the preview processing unit 90 may show a narrower field of view; however, more image details may be displayed, namely, the image feature 31 may be clearer.

Next, the feature extraction unit 30 may respectively extract a plurality of first image features from the third image 12 and a plurality of second image features from the fourth image 22 to generate a pixel offset feature 33 corresponding with the third image 12 and the fourth image 22 according to the plurality of first image features and the plurality of second image features. As FIG. 3 shows, part (A) of the FIG. demonstrates the third image 12 and part (B) demonstrates the fourth image 22. Because the first lens module 10 and the second lens module 20 may be mounted at the same side of the image capturing device 80, and guided toward the same direction, even though an angle of view is different slightly, the captured area shown in the central area may be substantially identical. As a result, by means of image features extraction and comparison of image features it can determine that the fourth image 22 may be in a corresponding area 32 of the third image 12.

The image zooming and distortion unit 40 may respectively zoom and adjust the third image 12 and the fourth image 22 according to a zoom ratio 41 provided by the input unit 60. The zoom ratio 41 can be controlled by a user using fingers sliding back and forth on the input unit 60, such as camera's or smartphone's touch screen, of the image capturing device 80. Subsequently, the image zooming and distortion unit 40 may zoom and deform the third image 12 and the fourth image 22 according to the zoom ratio 41 to respectively generate a fifth image 42 and a sixth image 43 as shown in parts (C) and (D) of FIG. 3. In practice, other than touch module, the input unit 60 can also include a group of keys, such as keyboard.

More specifically, while the image zooming and distortion unit 40 zooms the third image 12 according to the zoom ratio 41 to generate the fifth image 42, it may also zoom and deform the fourth image 22 by the pixel offset feature 33 and the set zoom ratio 41 to generate the sixth image 43. Wherein capturing area of the sixth image 43 is similar to a central area 34 of the fifth image 42 as shown in parts (C) and (D) of FIG. 3. Furthermore, when a user zooms the third image 12 by a multiple of 1.1 (at the moment, the formed fifth image 42 is larger than a display size 71 of the display unit 70) through the zoom ratio 41, and zooms the fourth image 22 by a multiple of 0.5 to generate the sixth image 42, the feature extraction unit 30 may extract the image feature (i.e. the first image feature in the third image 12 and the second image feature in the fourth image 22) corresponding with the fifth image 42 and the sixth image 43 to execute deformation and adjustment so that a corresponding area 321 in the sixth image 43 may be able to align with the corresponding area 32 in the fifth image 42. Pixel coordinate of the corresponding areas may be used to align with each other.

Moreover, the image fusing unit 50 may determine weightings of the fifth image 42 and sixth image 43 in the process of blending images according to the zoom ratio 41 provided by the input unit 60, that is, the fusion weighting of the two images; and the image fusing unit 50 may fuse the fifth image 42 and the sixth image 43 to generate a combined image 53 as shown in part (E) of FIG. 5. For example, when the zoom ratio 41 is a multiple of 1.1, the fifth image 42 may weight by 0.9 and the sixth image 43 may weight by 0.1; and when the zoom ratio 41 is a multiple of 1.8, the fifth image 42 may weight by 0.2 and the sixth image 43 may weight by 0.8.

Furthermore, a dynamic weighting method may be applicable to be applied to the image fusing unit 50 to fuse the fifth image 42 and the sixth image 43, and the dynamic weighting method may automatically determine weighting values of a plurality of first pixels of the fifth image 42 and a plurality of second pixels of the sixth image 43 according to the zoom ratio 41 and positions of the plurality of first pixels of the fifth image 42 and positions of the plurality of second pixels of the sixth image 43, and then may determine the weighting ratio of the fifth image 42 and the sixth image 42 in the process of blending according to the weighting values.

Finally, the combined image 53 may be displayed on the display unit 70 to enable the user seeing the shot image clearly through the display unit 70.

By way of conclusion, while previewing, it can selectively produce the combined image 53 according to the zoom ratio 41 by the image capturing device having two identical angle of view so as to lower the vagueness and distortion when executing the digital zoom display method, and currently, it may also consider about the smoothness of switching the long/short focal length via the digital zoom display method.

Figure 4:
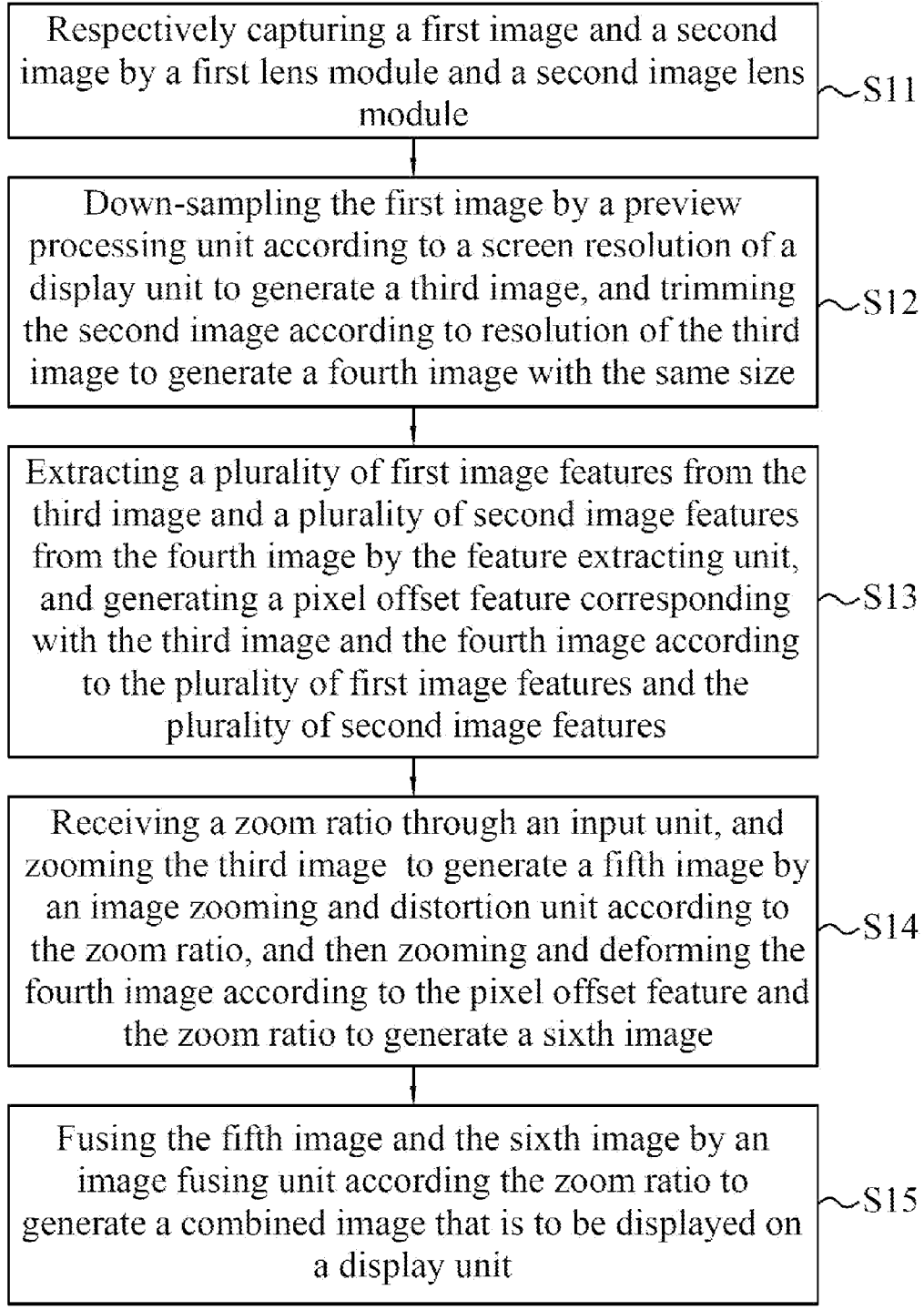
FIG. 4 is a flow chart of an embodiment of a digital zoom display method according to the present invention.

Please refer to FIG. 4 which is a flow chart of an embodiment of a digital zoom display method according to the present invention. In the FIG., the digital zoom display method may be applicable to an image capturing device 80 having a first lens module 10, a second lens module 20, a feature extraction unit 30, an image zooming and distortion unit 40, an image fusing unit 50, an input unit 60, a display unit 70 and a preview processing unit 90, wherein an angle of view of the second lens module 20 may be substantially identical to that of the first lens module 10. The digital zoom display method may be explained accompany with FIG. 1, and may include the following steps:

In step S11: respectively capturing a first image 11 and a second image 12 by the first image lens module 10 and the second lens module 20. Because the first lens module 10 and the second lens module 20 may be mounted at the same side of the image capturing device 80 and guided toward the same direction, the views shown in the central areas of the first 11 and the second 21 images captured by the first lens module 10 and the second lens module 20 may be substantially identical, and the first image 11 and the second image 21 may include the same image feature 31. What has to be noticed is that resolutions of the first image 11 and the second image 21 may be larger than the display unit 70.

In step S12: down-sampling the first image 11 by the preview processing unit 90 according to a screen resolution of the display unit 70 to generate a third image 12, and trimming the second image 21 according to resolution of the third image 12 to generate a fourth image 22 with the same size.

In step S13: extracting a plurality of first image features from the third image 12 and a plurality of second image features from the fourth image 22 by the feature extraction unit 30, and generating a pixel offset feature 33 corresponding with the third image 12 and the fourth image 22 according to the plurality of first image features and the plurality of second image features.

In step S14: receiving a zoom ratio 41 through the input unit 60, the image zooming and distortion unit 40 zooming the third image 12 according to the zoom ratio 41 to generate a fifth image 42, and then zooming or deforming the fourth image 22 according to the pixel feature 33 and the zoom ratio 41 to generate a sixth image 43. Wherein an angle of view of the zoomed or deformed sixth image 43 is similar to that in central area of the fifth image 42.

Furthermore, the image zooming and distortion unit 40 may use the feature extraction unit 30 to extract the image features corresponding with the fifth image 42 and the sixth image 43 to execute deforming and adjusting such that the areas corresponding with the fifth image 42 and the sixth image 43 can align with each other.

In step S15: fusing the fifth image 42 and the sixth image 43 by the image fusing unit 50 according to the zoom ratio 41 to generate the combined image 53 that may be displayed on the display unit 70. Wherein, resolution of the combined image 53 may be higher than the sixth image 43 such that it can lower the vagueness and distortion caused in the process of executing digital zoom display method.

Wherein, the step S15 further may include fusing the fifth image 42 and the sixth image 43 according a dynamic weighting method, wherein the dynamic weighting method may automatically determine weighting values of a plurality of first pixels of the fifth image and a plurality of second pixels of the sixth image according to the zoom ratio 41 and positions of the plurality of first pixels of the fifth image 42 and positions of the plurality of second pixels of the sixth image 43.

By means of a digital zoom display method of the present invention, when previewing images, it can selectively produce combined images according to zoom ratio such that the vagueness and distortion can be lowered when executing the digital zoom display method, at the same time, smoothness of switching the long/short focal length via the digital zoom display method may be considered.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An image capturing device, comprising:
   a display unit;
   a first lens module, configured to capture a first image;
   a second lens module, configured to capture a second image, wherein an angle of view of the second lens module is substantially identical to the first lens module;
   a preview processing unit, coupled to the first lens module and the second lens module and configured to generate a third image by down-sampling the first image according to a resolution of the display unit, and generate a fourth image by trimming the second image with an image size identical to the third image;
   a feature extraction unit, coupled to the preview processing unit and configured to extract a plurality of first image features in the third image and a plurality of second image features in the fourth image, and generate a pixel offset feature corresponding with the third image and the fourth image according to the plurality of first image features and the plurality of second image features;
   an image zooming and distortion unit, coupled to the feature extraction unit and configured to zoom the third image to generate a fifth image according to a zoom ratio, and zoom the fourth image to generate a sixth image according to the pixel offset feature and the zoom ratio, wherein an angle of view and a capturing area of the sixth image are similar to a central area of the fifth image; and
   an image fusing unit, coupled to the image zooming and distortion unit and a display unit and configured to fuse the fifth image and the sixth image according to the zoom ratio to generate a combined image that is to be displayed on the display unit.

2. The image capturing device of claim 1, wherein the feature extraction unit is configured to automatically compare and match the plurality of first image features with the plurality of second image features to generate the pixel offset feature.

3. The image capturing device of claim 1, wherein the image fusing unit is further configured to fuses the fifth image and the sixth image according to a dynamic weighting method, and the dynamic weighting method is to automatically determine weighting values of a plurality of first pixels of the fifth image and a plurality of second pixels of the sixth image according to the zoom ratio and positions of the plurality of first pixels of the fifth image and positions of the plurality of second pixels of the sixth image.

4. A digital zoom display method applicable to an image capturing device having a first lens module, a second lens module, an input unit, a display unit, a feature extraction unit, an image zooming and distortion unit, an image fusing unit and a preview processing unit, wherein an angle of view of the second lens module is substantially identical to that of the first lens module, and the method comprising:

(a) respectively capturing a first image and a second image by the first image lens module and the second lens module;
   (b) down-sampling the first image by the preview processing unit according to a resolution of the display unit to generate a third image, and trimming the second image to generate a fourth image with an image size identical to that of the third image;
   (c) extracting a plurality of first image features from the third image and a plurality of second image features from the fourth image by the feature extraction unit, and generating a pixel offset feature corresponding with the third image and the fourth image according to the plurality of first image features and the plurality of second image features;
   (d) receiving a zoom ratio by the input unit, and zooming the third image by the image zooming and distortion unit according to the zoom ratio to generate a fifth image, and then zooming and deforming the fourth image according to the pixel offset feature and the zoom ratio to generate a sixth image, wherein an angle of view and a capturing area of the sixth image are similar to a central area of the fifth image; and
   (e) fusing the fifth image and the sixth image by the image fusing unit according to the zoom ratio to generate a combined image that is to be displayed on the display unit.

5. The digital zoom display method of claim 4, wherein the pixel offset feature is generated by automatically comparing and matching the plurality of first image features with the plurality of second image features.

6. The digital zoom display method of claim 4, wherein the step (e) further comprises:

fusing the fifth image and the sixth image according a dynamic weighting method, wherein the dynamic weighting method is to automatically determine weighting values of a plurality of first pixels of the fifth image and a plurality of second pixels of the sixth image according to the zoom ratio and positions of the plurality of first pixels of the fifth image and the plurality of second pixels of the sixth image.

* * * * *